Figure 1:
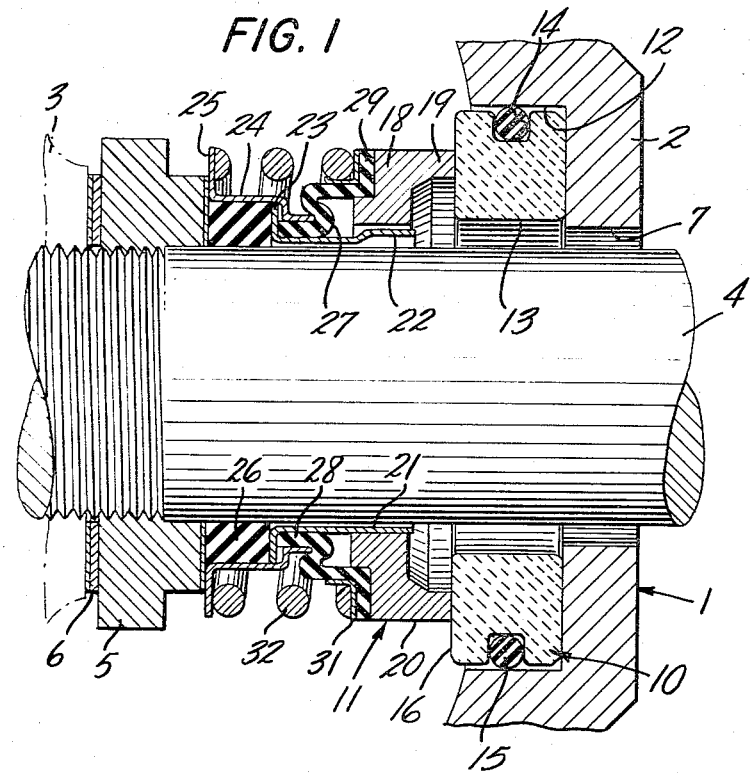

Feb. 27, 1968     G. E. BUSKE     3,370,856
FLUID SEALS FOR ABRASIVE MATERIAL
Filed Jan. 5, 1965

United States Patent Office 3,370,856
Patented Feb. 27, 1968

3,370,856
FLUID SEALS FOR ABRASIVE MATERIAL
Gilbert E. Buske, Stamford, Conn., assignor to Textron
Inc., Providence, R.I., a corporation of Rhode Island
Filed Jan. 5, 1965, Ser. No. 423,470
6 Claims. (Cl. 277—89)

The present invention relates to fluid tight seals and particularly to means for providing a seal between relatively rotating parts such as the casing and shaft of a rotary pump.

In rotary pumps used for pumping liquids, it is necessary to provide a liquid-tight seal between the pump casing and the impeller shaft of the pump which extends out through an opening in the casing for connection to a motor or other driving means. Such a seal is conveniently provided by a sealing ring rotating with the shaft and resiliently pressed against a stationary sealing ring seated in the casing opening through which the shaft extends. Such seals have, in general, been satisfactory. However, it has been found that when the liquid being pumped contains solid particles such as dirt, sand or gravel, such seal at times quickly wears out and has to be replaced. This phenomenon has been observed to be quite erratic and unpredictable in its occurrence. At times, the seals have been found to last for long periods of time even when pumping liquid containing solid particles. At other times, identical seals have been destroyed quickly under what appeared to be the same conditions. No reason for this erratic behavior was apparent. Changes in the material forming the rings and other changes in the seal were of no avail in solving this perplexing and persisting problem. Because of the seal being inside the pump, it cannot be observed during use to determine the cause of failure. The unpredictability of the seal life was particularly troublesome. A seal which was operating satisfactorily would suddenly fail. Because of this, it was necessary to keep the equipment under almost constant observation in order to detect seal failure when it occurred.

Through extensive work, seeking a solution to this troublesome problem, applicant has now discovered that the unpredictable failure of rotary seals operating with liquids containing solid particles appears to have been caused by larger particles becoming lodged between spaced parallel faces of the sealing rings outside the annular sealing area of engagement between the rings and momentarily wedging or camming the rings slightly apart so that smaller particles could enter between the sealing faces. This would result in rapid wear of the sealing rings because of the abrasive nature of such particles. This theory provides an explanation of the unpredictability of seal life. The presence of solid particles in the liquid being pumped does not ordinarily decrease the life of the seal since such particles cannot enter between the interengaging surfaces of the bearing rings. It is only when a particle of a particular shape and size enters between spaced parallel surfaces of the sealing ring outside the sealing area and wedges or cams the sealing surfaces momentarily apart, and when smaller particles happen to enter between the sealing surfaces while they are momentarily separated, that seal failure quickly occurs.

The present invention thus stems from the discovery of what appears to be the cause of the hitherto unexplained failure and provides a solution for this long existing problem. Once the theory as to why failure occurred had been evolved, it appeared that such failure would be avoided by redesigning the sealing rings so that there would be no spaced parallel surfaces between which solid particles could enter to wedge the sealing surfaces of the rings apart. The new design in accordance with the invention has been thoroughly tested and has been found to overcome the long existing problem of unpredictable seal failure. The results obtained with seals in accordance with the invention, thus appear to confirm the theory on which the invention is based.

Figure 2:
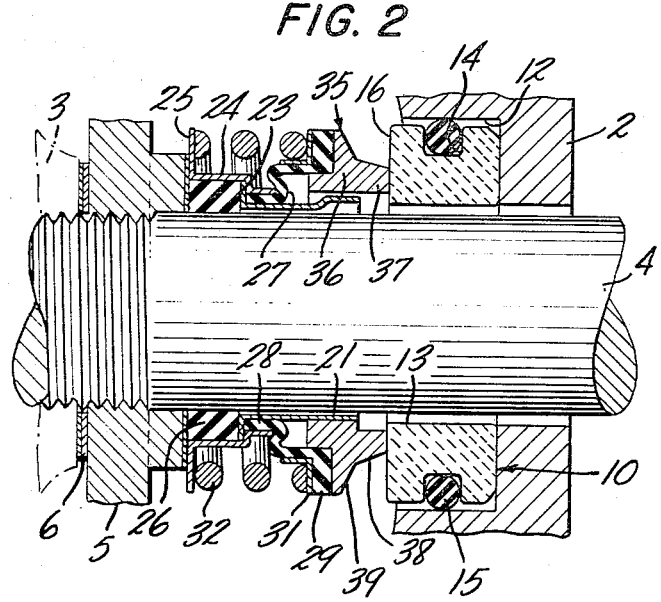

The invention will be more fully understood from the following description of preferred embodiments in conjunction with the accompanying drawings in which:

FIG. 1 is a partial axial section of a rotary seal in accordance with the present invention shown in conjunction with associated portions of a pump in which the seal is shown installed, and FIG. 2 is a similar axial section of another embodiment of the invention.

In FIG. 1, a rotary seal in accordance with the present invention is shown installed in a pump 1 having a casing 2 and an impeller 3 positioned on an impeller shaft 4 by a nut 5 and shims 6. The impeller shaft 4 extends out through an opening 7 in the pump casing 2 for connection to a motor or other driving means. The shaft is supported by suitable bearings (not shown). For example, the impeller shaft 4 may be an integral extension of the shaft of a gasoline or electric motor supported in usual manner by the motor bearings.

In order to prevent liquid being pumped from leaking out through the shaft opening 7 of the casing, a liquid tight seal must be provided between the shaft and casing. Such seal is provided by the co-operation of a stationary sealing ring 10 and a rotating sealing ring 11. The sealing ring 10 is shown as being of approximately rectangular cross-section and is seated in an annular recess 12 formed in the casing 2 concentric with the shaft opening 7. The inner periphery 13 of the stationary sealing ring 10—like the shaft opening 7 of the casing—is of larger diameter than the shaft 4 so as to provide substantial clearance and avoid frictional engagement with the shaft. In its outer periphery, the ring 10 is provided with an annular groove 14 of approximately rectangular cross-section to receive an O-ring 15 formed of rubber or like material to provide a fluid tight seal between the ring 10 and the casing 2. The ring 10 is formed of ceramic material or other hard, wear-resisting material and is provided with a smooth inner face 16 which preferably lies in a plane perpendicular to the axis of the impeller shaft 4.

The rotating ring 11 has an annular body portion 18 and a reduced lip portion 19 which projects axially from the body portion and terminates in an end face engaging the inner face 16 of the stationary sealing ring 10. It will be seen that the thickness of the lip 19 in a radial direction is less than that of the body portion 18 and is also less than the radial extent of the ring 10. The ring 11 rotates with the impeller shaft 4, but is axially movable relative to the shaft. Means is provided for pressing the rotating sealing ring 11 against the stationary sealing ring 10 and for providing a fluid tight seal between the ring 11 and the shaft 4 without undesirably restricting the axial freedom of movement of the ring 11. By way of example in the drawings, the rotating sealing ring 11 is shown as being axially slidable on a sleeve 21 which closely surrounds the shaft 4. A radially projecting protuberance 22 of the sleeve 21 extends into a radial recess in the inner periphery of the ring 11 to hold the ring against rotational movement relative to the sleeve 21. At its inner end, the sleeve 21 is provided with a radial flange 23 which is received in an annular collar 24 having a radial flange 25 which bears against the outer face of the above mentioned nut 5.

A ring 26 of rubber or like material provides a fluid tight seal between the collar 24 and the impeller shaft 4. A tubular boot 27 formed of rubber or other impervious flexible material has an inner end portion 28 clamped between portions of the sleeve 21 and collar 24 and an outer end portion provided with a radial flange 29 seated in an annular recess provided in the inner face of the rotary sealing ring 11. The opposite side of the flange 29 is engaged by a washer 31 of L-shaped cross-section. A helical compression spring 32 surrounds the impeller shaft 4 and acts between the flange 25 of the collar 24 and the washer 31 to press the flange portion 29 of the boot 27 against the sealing ring 11 and thereby press the sealing ring 11 toward the stationary sealing ring 10. It will be seen that the boot 27 in conjunction with the rubber ring 26 provides a fluid tight seal between the rotating sealing ring 11 and the impeller shaft 4 without undesirably restricting axial movement of the sealing ring 11 under the action of the compression spring 32. The flange 29 of the boot 27 may if desired be bonded to the sealing ring 11 for example by adhesive although the pressure of the spring 32 acting through the washer 31 is ordinarily sufficient to assure a fluid tight seal between the boot and the sealing ring 11 without the need of bonding materials. Similarly adhesive or other bonding material may be used on the inner end portion 28 of the boot 27 or on the rubber ring 26 but is ordinarily not necessary.

The rotating sealing ring 11 is formed of material which is hard and wear-resisting, but preferably not as hard as the material forming the stationary ring 10. For example, the ring 11 may be made of carbon, plastic or tool steel. In accordance with the present invention, the outer periphery of the rotating ring 11 recedes continuously from the radial face 16 of the stationary sealing ring 10 without any shoulders or other surfaces parallel to the radial face 16 of the stationary ring which would provide spaced surfaces between which solid particles in the liquid being pumped might lodge, so as to wedge or cam the rotating ring 11 away from the stationary ring 10 to permit smaller particles of solid material to enter between the end face of the lip 19 of the rotating ring and the radial face 16 of the stationary ring. As illustrated by way of example in FIG. 1, the outer peripheral surface 20 of the ring 11 including the body portion 18 and reduced lip portion 19 is substantially cylindrical and hence perpendicular to the radial face 16 of the stationary sealing ring 10. Hence, the sealing rings 10 and 11 have no spaced parallel surfaces between which solid particles can wedge to separate the rings.

In the embodiment illustrated in FIG. 2, the parts of the pump, the stationary sealing ring and the means for mounting the rotating sealing ring on the impeller shaft are shown the same as in FIG. 1 and are designated by the same reference numerals. However, the rotating sealing ring 35 is of different cross-sectional shape and comprises a body portion 36 provided with an annular recess to receive the flange portion 29 of the boot 27 and a reduced annular lip portion 37 which projects axially toward the stationary sealing ring 10 and has an annular end surface engaging the radial face 16 of the ring 10. It will be noted that the diameter of the lip 37 in FIG. 2 is less than that of the lip 19 in FIG. 1 so that the peripheral speed of the lip relative to the stationary sealing ring 10 is lower. The life of the seal is thereby increased if the other parameters are the same. The lip 37 may be of uniform thickness but is preferably tapered as shown, with a cylindrical inner surface and an outer peripheral surface 38 which diverges from the face 16 of the sealing ring 10 at an angle of the order of 60°. The outer peripheral surface 39 of the body portion of the ring 35 also is conical and is inclined at a sufficient angle to the face 16 of the sealing ring 10 to avoid particles lodging between the surfaces and wedging the two rings apart. It has been found that the angle of inclination should be at least of the order of 20° and preferably should be about 30° or more. It will thus be seen that because the peripheral surfaces of the sealing ring 35 continuously recede at a substantial angle from the radial surface 16 of the sealing ring 10, there are no spaced parallel ring surfaces between which solid particles can wedge to lift the lip portion 37 of the rotating sealing ring 35 off of the radial sealing surface of the stationary sealing ring 10. The angles between the radial face 16 and the peripheral surfaces 38 and 39 must be large enough that solid particles in the liquid being pumped cannot wedge between the surfaces so as to separate the sealing ring. In practice, it has been found that the angle should be at least about 20° and preferably at least about 30° to avoid the possibility of solid objects in the liquid being pumped, wedging between the surfaces.

Through extensive use, it has been found that sealing rings in accordance with FIGS. 1 and 2, both give excellent results and avoid the failures experienced with rings made in accordance with the prior art. While two embodiments of the invention have been shown by way of example in the drawings, it will be understood that the invention is in no way limited to these particular embodiments and that modifications of construction may be made within the scope of the appended claims.

What I claim is:

1. In a rotary pump for liquids containing solid particles, comprising a casing having a shaft opening, an impeller shaft extending through said opening and an impeller mounted on said shaft in said casing; a rotary liquid tight seal on said shaft between said impeller and casing in position where it is exposed to the liquid and solid particles being pumped, said seal comprising a first sealing ring surrounding said shaft adjacent said opening, means providing a fluid tight seal between said first sealing ring and casing and holding said first sealing ring against rotation, said first sealing ring having an annular radial sealing surface facing inwardly of said casing, a second sealing ring surrounding and rotating with said shaft inside said casing and contiguous with said first sealing ring, said second sealing ring having an annular body portion and an integral annular lip portion of less radial extent than said body portion extending axially toward and engaging said radial sealing surface of said first sealing ring, flexible sealing means providing a fluid tight seal between said shaft and said second sealing ring while permitting limited movement of said second sealing ring relative to said shaft, means biasing said second sealing ring toward said first sealing ring to press said annular lip portion of said second sealing ring against said annular sealing surface of said first sealing ring, the outer peripheral surface of said second sealing ring receding continuously from said radial sealing surface of said first sealing ring at an angle of at least 20° to provide continuously diverging surfaces and avoid spaced abutment surfaces between which solid particles can wedge to lift said lip portion of said second sealing ring off of said radial sealing surface of said first sealing ring, the space radially surrounding said seal being free and unconfined to permit expulsion of said particles from between said diverging surfaces.

2. A rotary liquid tight seal according to claim 1, in which the outer peripheral surface of said second sealing ring is approximately cylindrical.

3. A rotary liquid tight seal according to claim 1, in which the outer peripheral surface of said second sealing ring comprises a first frusto-conical portion adjacent said sealing surface disposed at an angle of not more than thirty degrees to the axis of said shaft and a second portion which is frusto-conical with a greater angle of inclination to the axis of said shaft.

4. In a rotary pump for liquids containing solid particles, comprising a casing having a shaft opening, an impeller shaft extending through said opening and an impeller mounted on said shaft in said casing; a rotary liquid tight seal on said shaft between said impeller and casing in position where it is exposed to the liquid and solid particles being pumped, said seal comprising two cooperating sealing rings, means mounting one of said rings on said shaft coaxially therewith and providing a fluid tight seal between said one ring and said shaft, means mounting the other of said rings on said casing coaxially with said shaft and providing a fluid tight seal between said other ring and said casing, the other of said rings having an annular flat radial sealing surface facing said one ring and said one ring having a body portion and an integral annular lip portion extending axially toward said flat sealing surface and terminating in an annular flat end face of less radial extent than said flat sealing surface, means for resiliently urging said rings toward one another to press said flat end face of said lip against said flat radial sealing surface in an annular area of engagement to provide a fluid tight seal, the outer peripheral surfaces of said one ring outwardly of said annular area of engagement continuously diverging from said flat radial sealing surface at an angle of at least about 20° to avoid spaced abutment surfaces between which said solid particles can wedge to lift said end face of said lip portion off of said flat sealing surface to permit solid particles to get between said end face and flat surface, the space radially surrounding said seal being free and unconfined to permit expulsion of said particles from between said diverging surfaces.

5. In a rotary pump for liquid containing solid particles, comprising a casing having a shaft opening with a cylindrical bore and a shoulder axially outwardly of said bore, an impeller shaft extending through said opening and an impeller mounted on said shaft inside the casing; a rotary liquid tight seal on said shaft between said impeller and casing in position where it is exposed to the liquid and solid particles being pumped, said seal comprising a stationary sealing ring of generally rectangular cross section with an inner diameter substantially larger than the diameter of said shaft, a substantially radial sealing surface facing the impeller and an annular groove in its outer periphery, said stationary sealing ring being received in said bore and seating against said shoulder, an O-ring received in said groove and engaging said bore to provide a fluid tight seal between the stationary sealing ring and the casing; a rotating sealing ring surrounding the shaft between the impeller and said stationary sealing ring, said rotating sealing ring having inner and outer diameters less than the inner and outer diameters of the stationary sealing ring and having an annular body portion and a lip portion projecting toward said stationary sealing ring from the outer peripheral portion of said body portion and engageable with the sealing surface of the stationary sealing ring intermediate its inner and outer peripheries, means mounting said rotating sealing ring on the shaft for rotation therewith and axial movement relative thereto, flexible sealing means providing a fluid tight seal between the shaft and the rotating sealing ring while permitting limited axial movement of the rotating sealing ring relative to the shaft, and means biasing the rotating sealing ring toward the stationary sealing ring to press said lip portion of the rotating sealing ring against said sealing surface of the stationary sealing ring, the outer peripheral surface of the rotating sealing ring including said lip being substantially cylindrical and free of projecting portions against which solid particles in the liquid being pumped can wedge to move said lip out of engagement with said sealing surface.

6. In a rotary pump for liquid containing solid particles, comprising a casing having a shaft opening with a cylindrical bore and a shoulder axially outwardly of said bore, an impeller shaft extending through said opening and an impeller mounted on said shaft inside the casing; a rotary liquid tight seal on said shaft between the impeller and casing in position to be exposed to the liquid and solid particles being pumped, said seal comprising a stationary sealing ring of generally rectangular cross section with an inner diameter larger than the diameter of said shaft, a substantially radial sealing surface facing the impeller and an annular groove in its outer periphery, said stationary sealing ring being received in said bore and seating against said shoulder, an O-ring received in said groove and engaging said bore to provide a fluid tight seal between the stationary sealing ring and the casing; a rotating sealing ring surrounding the shaft between the impeller and said stationary sealing ring, said rotating sealing ring having an annular body portion and a lip portion projecting toward said stationary sealing ring from said body portion and having an outer end engageable with the sealing surface of the stationary sealing ring intermediate its inner and outer peripheries, means mounting said rotating sealing ring on the shaft for rotation therewith and axial movement relative thereto, flexible sealing means providing a fluid tight seal between the shaft and the rotating sealing ring while permitting limited axial movement of the rotating sealing ring relative to the shaft, and means biasing the rotating sealing ring toward the stationary sealing ring to press said lip portion of the rotating sealing ring against the sealing surface of the stationary sealing ring, said lip portion having an inner diameter greater than the inner diameter of the stationary sealing ring and an outer diameter at its outer end less than the maximum outer diameter of said body portion, the outer peripheral surface of said lip portion meeting the sealing surface of the stationary sealing ring at an angle not less than about sixty degrees and the outer peripheral surface of said body portion at the base of said lip portion being frusto-conical with an angle of inclination relative to said sealing surface of the stationary sealing ring less than that of the outer peripheral surface of said lip portion but not less than about thirty degrees to avoid any abutment surfaces between which said solid particles can wedge to move said lip portion out of engagement with said sealing surface.

References Cited
UNITED STATES PATENTS

| | | | |
|---|---|---|---|
| 1,825,918 | 10/1931 | Peltier et al. | 277—89 |
| 2,375,085 | 5/1945 | Curtis | 277—89 |
| 2,994,547 | 8/1961 | Dolhun et al. | 277—89 |

LAVERNE D. GEIGER, *Primary Examiner.*

D. MASSENBERG, *Assistant Examiner.*